United States Patent [19]

Bushman et al.

[11] 4,070,959
[45] Jan. 31, 1978

[54] APPARATUS FOR EXTRACTING OIL FROM THE RIND OF WHOLE CITRUS FRUIT

[75] Inventors: Ronald C. Bushman, Hacienda Heights; Franklin K. Holbrook, La Habra, both of Calif.

[73] Assignee: Brown International Corporation, Covina, Calif.

[21] Appl. No.: 654,640

[22] Filed: Feb. 2, 1976

[51] Int. Cl.² .................... A23N 1/00; B02C 15/00; B26D 1/00
[52] U.S. Cl. ........................................ 99/510; 241/277
[58] Field of Search ............... 99/495, 501, 504, 509, 99/510; 198/76, 127 R, 160, 167; 83/2; 241/200, 277, 280

[56] References Cited

U.S. PATENT DOCUMENTS

| 2,327,280 | 8/1943 | McCashen | 99/509 |
|---|---|---|---|
| 3,136,094 | 6/1964 | Reaser | 198/167 |
| 3,707,176 | 12/1972 | Bushman | 99/495 |

FOREIGN PATENT DOCUMENTS

| 470,682 | 11/1950 | Italy | 146/177 |

*Primary Examiner*—Leonard D. Christian
*Assistant Examiner*—Robert Pous
*Attorney, Agent, or Firm*—Lyon and Lyon

[57] ABSTRACT

Horizontal rolls define troughs between them for reception and support of whole citrus fruit, each roll including a plurality of thin metal rings mounted in axially spaced relationship, each ring having a continuous series of pointed teeth on its periphery, and each ring being inclined to its rotary axis whereby rotary movement of the rings causes wobble movement of the disk peripheries so that penetration of the teeth is substantially uniform over the entire outer surface of each fruit. The rolls are turned in the same direction, each successive roll in a series turning at a slower speed. Washers are positioned between each pair of toothed rings and are free to move radially to prevent buildup of seeds, buttons, pieces of peel or other foreign matter on the toothed rings.

2 Claims, 8 Drawing Figures

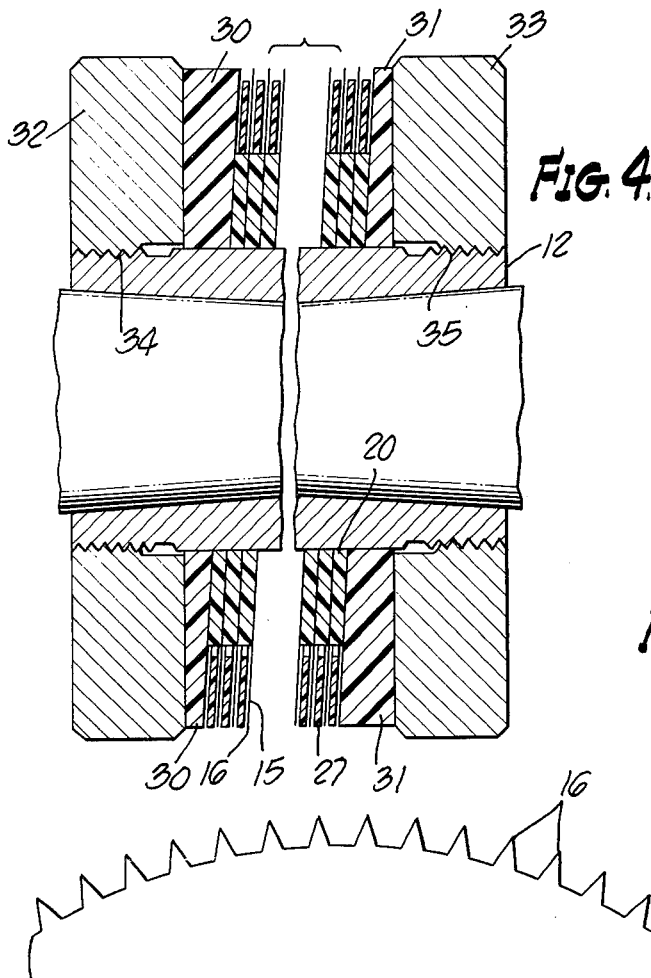
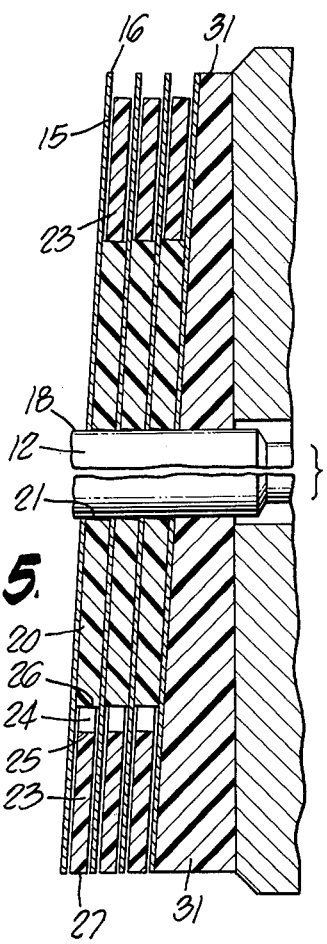
FIG. 4.
FIG. 5.
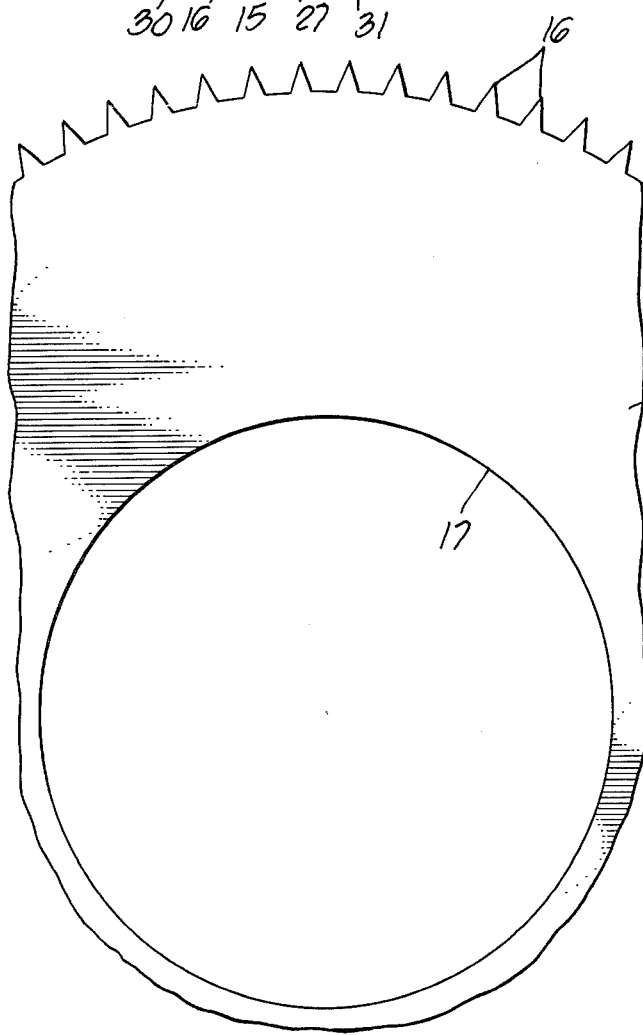
FIG. 6.
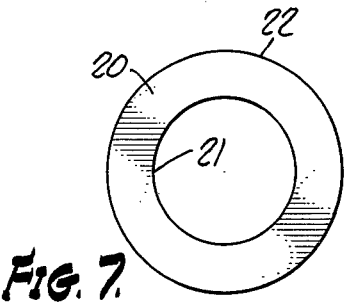
FIG. 7.
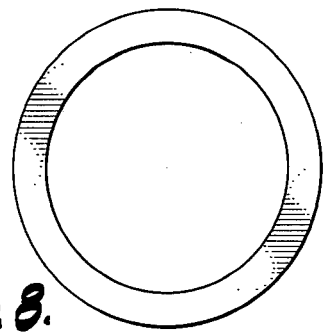
FIG. 8.

APPARATUS FOR EXTRACTING OIL FROM THE RIND OF WHOLE CITRUS FRUIT

This invention relates to apparatus for extracting peel oil from whole citrus fruit.

In the copending application of Franklin K. Holbrook Ser. No. 421,104 filed Dec. 3, 1973, now U.S. Pat. No. 3,954,032 whole citrus fruit was caused to be moved longitudinally along troughs formed in part by metal rolls having sharp teeth. Each whole fruit stayed in the same trough in which it started and moved longitudinally of the rotating rolls. In the device embodying the present invention, the whole fruit travels transversely of the toothed rolls, and moves into and out of each trough defined between adjacent rolls. The puncture action of the sharp teeth is improved so as to cover the entire outer surface of each whole fruit in a substantially uniform manner, and this is achieved by constructing the rolls with a large number of spaced toothed rings all parallel and all mounted at an angle inclined to the axis of rotation of the roll, so that the toothed peripheries of the rings wobble as the rings turn.

The depth of penetration of the sharp teeth on the periphery of each thin ring is controlled by means of annular washers placed between each pair of toothed rings, the washers having limited radial movement with respect to the rings to limit the depth of penetration of the sharp teeth. The loose washers also have the important function of preventing the buildup of seeds, pieces of peel, etc. on the teeth of the rings because each is free to move to a position tangent to the outer diameter of the toothed rings in order to dislodge any foreign matter.

A large number of horizontal parallel rolls are employed, but they are preferably driven in small groups or series. Each successive roll in the series is turned at a slower speed, and each slower speed roll turns at a fixed percentage of the speed of the next higher speed roll. This differential speed drive in each series of rolls has been found to produce the desired "bite" of the sharp teeth into the oil cells of the rind.

Other and more detailed objects and advantages will appear hereinafter.

In the drawings:

FIG. 1 is a side elevation showing a preferred embodiment of this invention.

FIG. 2 constitutes an enlargement of a portion of FIG. 1, with chain and sprocket drives indicated in phantom lines.

FIG. 4 is a sectional detail partly broken away, showing the apparatus for clamping together the component parts of one of the rolls.

FIG. 5 is a fragmentary sectional view partly broken away, showing the roll components on an enlarged scale.

FIG. 6 is an elevation view partly broken away, showing one of the toothed rings on an enlarged scale.

FIG. 7 is an end elevation showing one of the resilient disks.

FIG. 8 is an end elevation showing one of the washers.

Figure 1:
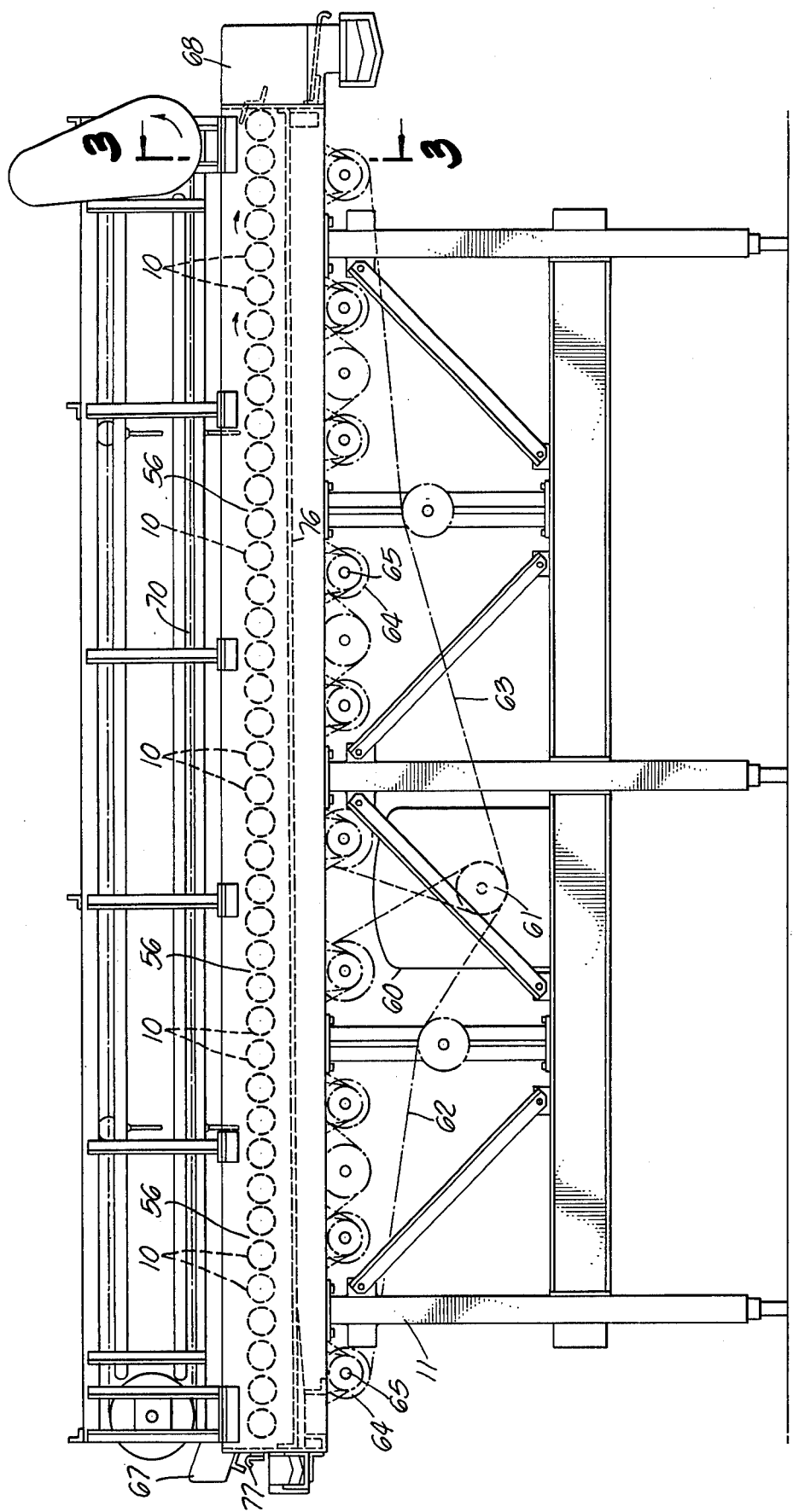

Referring to the drawings, a plurality of parallel horizontal rolls 10 are mounted for turning movement on a stationary support frame 11. The rolls 10 are duplicates and each is provided with a rotary shaft 12 mounted to turn in axially spaced self-aligning bearings 13 and 14, mounted on the support frame 11. Each shaft 12 is encircled by a large number of very thin metal rings 15 each having sharp teeth 16 on its circular outer periphery. Each ring 15 has a central opening 17 which is slightly larger than the diameter of the central portion 18 of the shaft 12. Each thin metal ring 15 remains essentially flat, but each is cocked or canted so that it is inclined with respect to the shaft axis 19. The rings 15 are parallel and are spaced apart by resilient spacer disks 20 having a central opening 21 which contacts the central portion 18 of the shaft 12.

The resilient disks 20 are smaller on outside diameter than the toothed rings 15, and the outer cylindrical surface 22 of each resilient disk 20 is loosely encircled by an annular washer 23, preferably formed of polyvinylchloride. The clearance 24 between the inner surface 25 of the washer 23 and the outer surface 26 of the resilient disk 20 permits a maximum sliding movement of each washer 23 to bring its smooth outer periphery 27 flush with the extremities of the pointed teeth 16 of the thin metal rings 15. The function of the annular washers 23 which slide relative to the toothed metal rings 15 is set forth below.

The thin metal rings 15 and the resilient disks 20 which space them apart are clamped together to turn as a unit with the shaft 12. They are held in canted position inclined to the shaft axis 19 by means of circular tapered blocks 30 and 31. As best shown in FIG. 4, these tapered blocks 30 and 31 are duplicates but are circumferentially spaced by 180°. Clamping nuts 32 and 33 engage threaded portions 34 and 35, respectively, on the shaft 12 to clamp the blocks 30, 31, toothed rings 15, and resilient disks 20 in an axial direction so that they cannot move with respect to the shaft 12. When the shaft 12 rotates, the toothed peripheries of the thin metal rings all wobble in unison. This wobble motion of the rotating toothed rings has a very beneficial effect in causing the rind of the citrus fruit to be penetrated by the sharp teeth 16 in a substantially uniform manner, as pointed out below.

Each shaft 12 has a detachable end portion 36 at one end and a detachable extension 37 at the other end. The detachable portion 36 comprises a stud 38 threaded at both ends and extending loosely through a central passage in a sleeve 39. The sleeve 39 has a taper projection 40 received within a taper socket 41 in one end of the shaft 12. The sleeve 39 also has a cylindrical portion 42 received within the bearing 14. A seal ring 43 is mounted in a groove 44 in the cylindrical portion 42. The sleeve 39 is installed in the shaft 12 after the roll 10 is in place between elements of the support frame 11. The sleeve 39 and stud 38 are inserted axially to bring the taper portion 40 into seating position in the taper socket 41. A part of this axial motion involves turning movement of the stud 38 to cause its threads 47 to engage the threaded socket 46 in the shaft 12. A nut 48 fixed to the stud 38, as by welding, provides a shoulder 50 which can be brought into contact with the small end of the taper portion 40 to separate it from the taper socket 41, when it is desired to do so. The exposed nut 49 on the other end of the stud 38 is secured to the stud 38 by means of the pin 50. From this description it will be understood that turning of the exposed nut 49 causes the stud 38 to move axially along the threads 46, 47 and to cause the shoulder 50 of the nut 48 to contact the small end of the taper portion 40 to break its engagement within the taper socket 41. In this way the demountable portion 36 of the shaft 12 can be removed axially without disturbing the axial position of the roll 10.

The detachable extension 37 is constructed in a manner similar to that just described in connection with the detachable portion 36, and accordingly it can also be removed axially from the shaft 12. This permits the roll 10 to be removed and replaced without dismantling the support frame 11.

Means are provided for turning the rolls, and, as shown in the drawings, this means includes a sprocket 51 clamped to each detachable extension 37 by means of a clamping nut 52 and spacer collar 53. In the particular form of the invention shown in the drawings, and particularly FIG. 2 thereof, the horizontal rolls 10 and sprockets 51 are arranged in several groups or series of four. Drive chains 54 and 55 engage the sprockets to turn all of them in the same direction but to turn the second, third and fourth sprockets in each series at a progressively lower speed. For example, if the speed of the first sprocket is taken as 100 percent, the second sprocket may be driven at 90 percent, the third sprocket at 81 percent, and the fourth sprocket at 72.9 percent. In this illustration, each slower speed roll is turned at 90 percent of the speed of the next higher speed roll. Such a speed difference between adjacent rolls in each series has been found to produce the optimum amount of penetration of the sharp teeth 16 into the rind of whole citrus fruit (not shown) received in and supported by the troughs 56 defined between adjacent rolls 10.

An electric motor 60 turns a pair of drive sprockets 61 one of which drives endless chain 62 and the other drives endless chain 63. The chain 62 is trained over sprockets 64 fixed on a series of countershafts 65. Similarly, chain 63 serves to drive additional sprockets 64 on additional countershafts 65. Two driving sprockets 66 are fixed on each countershaft 65; one of them drives the chain 54 and the other drives chain 55 for each series of rolls 10. The chain 54 drives two of the rolls, and the chain 55 drives the other two rolls in each series. The sizes of the sprockets 51 are chosen to provide the proper speed for the particular roll driven by each sprocket, respectively.

Figure 2:
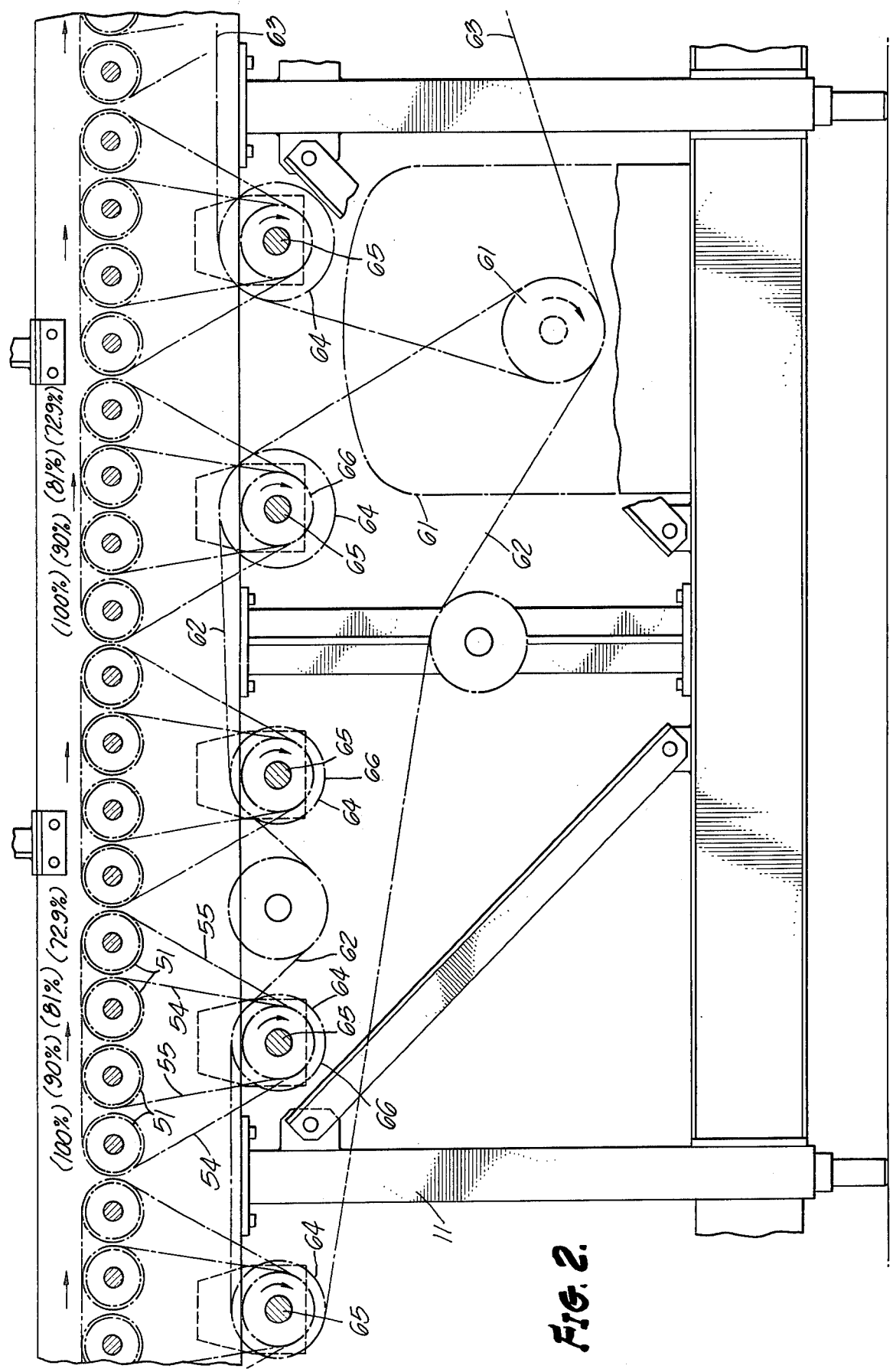
Figure 3:
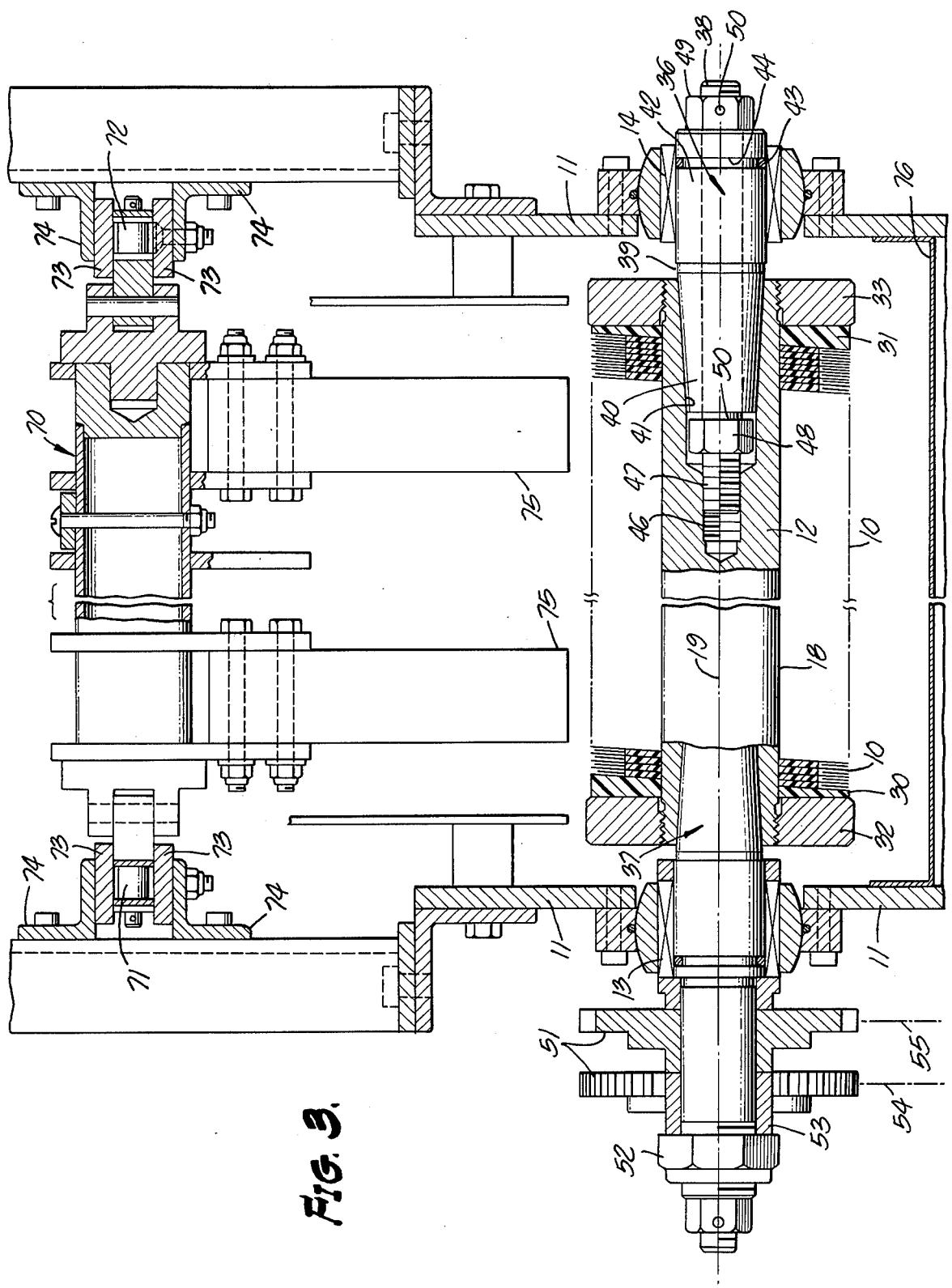
FIG. 3 is a sectional elevation partly broken away, taken substantially on the lines 3—3 as shown in FIG. 1.

The apparatus is designed so that movement of whole citrus fruit takes place in the direction of the arrows shown in FIG. 2, the incoming fruit at the entrance end 67 serving to push the other fruit ahead of it. The fruit reaches the discharge end 68 after passing transversely over each of the rolls 10 and through each of the troughs. As one fruit is dislodged from a trough it moves to the next trough and dislodges another fruit, etc.

A continuously running overhead conveyor assembly 70 is provided to move the fruit over the rolls 10 and troughs 56 to the discharge end 68 should the supply of incoming fruit be interrupted. Drive chains 71 and 72 move along tracks defined between parallel bars 73 carried on stationary brackets 74. Pendulum pushers 75 are mounted to swing on the support structure 11 carried by the chains 71 and 72.

A body of water in the shallow pan 76 has its upper surface flush with the top of all of the rolls 10. The pan 76 is carried on the frame structure 11 and, as shown in FIG. 1, the pool of water is deeper near the entrance end 67 than near the discharge end 68. Since the rolls all turn in the same direction a current is generated in the pool of water, the current moving from the discharge end 68 toward the entrance end 67. Any debris is therefore carried by the current and up and over a full-width weir 77. Oil from the rind of the fruit is carried into the pool of water and is later removed by conventional means, not shown.

In operation, whole citrus fruit in bulk after washing is delivered to the entrance end 67 of the machine and spreads out over the rotating rolls 10 and into the troughs 56 defined between the rolls. Each whole fruit turns and spins as the sharp teeth 16 on the thin metal rings puncture the oil cells in the rind. The difference in speed between the four rolls in each series causes the sharp teeth to penetrate the oil cells in the whole fruit and the depth of penetration is limited by the washers 23 which are free to move radially with respect to the toothed metal rings 15. The primary means of propelling the whole fruit through the machine is the force exerted by the incoming fruit. As one fruit is dislodged from a trough 56, it advances to the next trough and dislodges another fruit, etc.

The free moving washers 23 prevent the accumulation of seeds, buttons, and pieces of peel on the rolls 10. As the outer surface of each whole fruit is being penetrated by teeth on the rings 15 forming the trough 56, the fruit shifts the washer 23 to a position in rolling contact with the resilient disk 20 which underlies it, bringing the outside surface of the washer 23 approximately tangent to the outside diameter of the toothed rings 15. This action serves to eject any extraneous material and prevents it from building up on the sharp teeth 16.

The continuously moving conveyor assembly 70 with its pendulum pushers 75 moves at about the same speed as the speed of travel of the bulk of whole fruit through the machine, and the pendulum pushers 75 comes into effective action only when the supply of whole fruit is shut off or reduced at the entrance end 67.

Having fully described our invention, it is to be understood that we are not to be limited to the details herein set forth, but that our invention is of the full scope of the appended claims.

We claim:

1. Apparatus for extracting oil from the rind of whole citrus fruit, comprising, in combination: a plurality of parallel horizontal rolls defining troughs between them for reception and support of whole citrus fruit, each roll comprising a shaft having an axis of rotation, a series of parallel rings mounted in inclined position on the shaft, each ring being formed of thin metal and having a continuous series of pointed teeth on its periphery, a plurality of spacer disks each mounted on the shaft between two adjacent rings, means for clamping said metal rings and spacer disks end to end, a plurality of annular washers each loosely encircling a spacer disk and having clearance space between adjacent rings, whereby rotary movement of the shaft, rings and spacers causes wobble movement of the disk peripheries, radial movement of the washers serving to displace material accumulating between adjacent rings.

2. The combination set forth in claim 1 in which said means for clamping the metal rings and spacer disks includes two duplicate tapered blocks, one at each end of the series of rings, circumferentially spaced by 180°.

* * * * *